US008255199B2

(12) United States Patent
Yi

(10) Patent No.: US 8,255,199 B2
(45) Date of Patent: Aug. 28, 2012

(54) CHARACTERIZING PERFORMANCE OF AN ELECTRONIC SYSTEM

(75) Inventor: Hyuk-Jong Yi, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 967 days.

(21) Appl. No.: 12/120,894

(22) Filed: May 15, 2008

(65) Prior Publication Data

US 2009/0287462 A1    Nov. 19, 2009

(51) Int. Cl.
*G06F 17/50* (2006.01)
(52) U.S. Cl. .......................................... 703/14
(58) Field of Classification Search ............... 703/14, 703/19; 716/113, 108, 103, 127
See application file for complete search history.

(56) References Cited

U.S. PATENT DOCUMENTS

| | | | | |
|---|---|---|---|---|
| 5,095,454 A | * | 3/1992 | Huang | 703/19 |
| 5,553,008 A | * | 9/1996 | Huang et al. | 703/14 |
| 5,901,305 A | * | 5/1999 | Futagami | 703/16 |
| 2002/0161947 A1 | * | 10/2002 | Ikeda et al. | 710/38 |

OTHER PUBLICATIONS

Mutoh et al., 1-V Power Supply High-Speed Digital Circuit Technology with Multithreshold-Voltage CMOS, Aug. 1995, IEEE, vol. 30 No. 8, pp. 847-854.*

* cited by examiner

*Primary Examiner* — Dwin M Craig
*Assistant Examiner* — Bernard E Cothran
(74) *Attorney, Agent, or Firm* — Mendelsohn, Drucker & Associates, P.C.; David L. Cargille; Steve Mendelsohn

(57) ABSTRACT

In one embodiment of the present invention, the performance of an electronic circuit having a clock path between a clock source cell and a clock leaf cell is characterized over a simulation duration, where the clock path has one or more intermediate cells. Variations in the effective power supply voltage level least one intermediate cell over the simulation duration are determined using a system-level power-grid simulation tool. Static timing analysis (STA) software is used to determine cell delays for at least one of the intermediate cells for different clock-signal transitions at different times during the simulation duration. The cell delays are then used to generate one or more metrics characterizing the performance of the electronic circuit, such as maximum and minimum pulse widths, maximum cycle-to-cycle jitter, and maximum periodic jitter.

19 Claims, 3 Drawing Sheets

CHARACTERIZING PERFORMANCE OF AN ELECTRONIC SYSTEM

BACKGROUND OF THE INVENTION

1. Field of the Invention

The field of this invention is electronics, and particularly the simulation of electronic circuitry using computer-based simulation tools.

2. Description of the Related Art

A typical integrated circuit (IC) contains thousands of clock paths. A clock path p is a sequence of one or more intermediate cells m that carry a clock signal from a clock source cell to a clock leaf cell. The number of intermediate cells in p is denoted $m_p$. In a typical clock path, $m_p$ is 3-30. Each intermediate cell commonly contains 5-20 individual electronic components, e.g., transistors, diodes, etc.

FIG. 1 is a block diagram of a typical clock path 120. Clock path 120 connects clock source cell 110, e.g., a phase-locked loop, to clock leaf cell 130, e.g., a flip-flop. Clock source cell 110 is labeled m=0, and clock leaf cell 130 is labeled m=$m_p$+1, in this case, 5. Clock path 120 comprises four intermediate cells 122, labeled m=1 through m=4=$m_p$. Interconnects 124 connect clock source cell 110, intermediate cells 122, and clock leaf cell 130 to each other. In general, for each intermediate cell m=1 . . . $m_p$–1, the immediately following cell is also an intermediate cell, but, for the last intermediate cell $m_p$, the immediately following cell is the clock leaf cell $m_p$+1.

A clock source cell, such as clock source cell 110 in FIG. 1, transmits a clock signal. A typical clock signal is a periodic alternation between a low voltage value and a high voltage value, i.e., a square wave. A transition from a low voltage value to a high voltage value is a rising-edge transition, and a transition from a high voltage level to a low voltage level is a falling-edge transition. Consecutive transitions of a like kind (e.g., consecutive rising-edge transitions) are consecutively numbered and represented by the variable i. Thus, consecutive rising-edge transitions are numbered i=1, i=2, i=3, etc., and consecutive falling-edge transitions are similarly numbered i=1, i=2, i=3, etc.

The time at which a rising-edge transition i is received at the input of either an intermediate cell m=1 . . . $m_p$ in clock path p or clock leaf cell $m_p$+1 is denoted $T_{r(p,i,m=m-1)}$. Thus, for example, $T_{r(p,i,m=0)}$ is the time at which rising-edge transition i is received at the input of first intermediate cell m=1, and $T_{r(p,i,m=m_p)}$ is the time at which rising-edge transition i is received at the input of clock leaf cell $m_p$+1. Similarly, the time at which a falling-edge transition i is received at the input of either an intermediate cell m=1 . . . $m_p$ in clock path p or clock leaf cell $m_p$+1 is denoted $T_{f(p,i,m=m-1)}$.

The ideal pulse width $PW_{ideal}$ of a clock signal is the duration between the time (e.g., $T_{r(p,i,m=0)}$) at which a transition is received at the input of the first intermediate cell m=1 and the time (e.g., $T_{f(p,i,0)}$) at which the immediately following transition is received at that same input. The ideal clock cycle $T_{ideal}$ of a clock signal is the duration between the time (e.g., $T_{r(p,i,m=0)}$) at which a transition is received at the input of the first intermediate cell m=1 and the time (e.g., $T_{f(p,i,m=0)}$) at which the immediately following transition of a similar kind (i.e., falling edge to falling edge or rising edge to rising edge) is received at that same input.

The cell delay $Dc_{r(p,i,m)}$ of intermediate cell m (i.e., the amount of time that it takes for a rising-edge transition i to propagate from the input of intermediate cell m to the input of the immediately following cell m+1) is the difference between $T_{r(p,i,m)}$ and $T_{r(p,i,m=m-1)}$. Similarly, the cell delay $Dc_{f(p,i,m)}$ of intermediate cell m (i.e., the amount of time that it takes for a falling-edge transition i to propagate from the input of intermediate cell m to the input of the immediately following cell m+1) is the difference between $T_{f(p,i,m)}$ and $T_{f(p,i,m-1)}$.

The clock-path delay $DL_{r(p,i)}$ of rising-edge transition i in clock path p is the sum of cell delays $Dc_{r(p,i,m=1)}$ through $Dc_{r(p,i,m=m_p)}$. Similarly, clock-path delay $DL_{f(p,i)}$ for falling-edge transition i in clock path p is the sum of cell delays $Dc_{f(p,i,m=1)}$ through $Dc_{f(p,i,m=m_p)}$.

If the clock-path delays of a clock path are constant over time, then the clock signal received at the input of the clock leaf cell $m_p$+1 will possess ideal pulse width $PW_{ideal}$ and ideal clock cycle $T_{ideal}$. Clock-path delays, however, can vary over time due to variations in the delays of one or more intermediate cells in the clock path. One cause of cell-delay variation is change in the intermediate cell's effective power supply voltage $V_{eff,m}$, defined as the difference between the intermediate cell's high power supply voltage $V_{DD,m}$ and the intermediate cell's low power supply voltage $V_{SS,m}$. Specifically, higher $V_{eff,m}$ typically results in smaller cell delays, and lower $V_{eff,m}$ typically results in greater cell delays.

Thus, a $V_{eff,m}$ drop or rise between any two transitions will typically cause an increase or decrease in the clock-path delay of clock path p, in turn causing the second transition to transit clock path p in a greater or lesser amount of time than the first transition. In that case, the duration between those two transitions will diverge from an ideal duration. For example, a $V_{eff,m}$ increase between a rising-edge transition and an immediately following falling-edge transition propagating through clock path p may reduce clock-path delay for the second, falling-edge transition. As such, that second transition will transit clock path p in less time than the first transition, causing the duration between those two transitions, i.e., the pulse width, to decrease and thus diverge from $PW_{ideal}$. Similarly, a $V_{eff,m}$ decrease between two consecutive falling-edge transitions may cause the second transition to occur later than ideal and hence cause the duration between those two transitions, i.e., the clock cycle, to increase and diverge from $T_{ideal}$.

FIG. 2 graphically illustrates the effect of variations in the effective power supply voltage of an intermediate cell m in clock path p on a clock signal transiting that cell. In particular, FIG. 2(a) shows a clock signal as it appears at the input of the first intermediate cell (i.e., m=1) in clock path p, a square wave with ideal pulse width $PW_{ideal}$, ideal clock period $T_{ideal}$, and transitions at times $T_{r(p,i=1,m=0)}$ through $T_{f(p,i=3,m=0)}$. FIG. 2(b) shows variations in $V_{eff,m=1}$ over time. FIG. 2(c) shows the clock signal received at the input of the immediately following cell, the clock signal's transitions delayed by cell delays $Dc_{r(p,i=1,m=1)}$ through $Dc_{f(p,i=3,m=1)}$, yielding transition times $T_{r(p,i=1,m=1)}$ through $T_{f(p,i=3,m=1)}$. Note that maximum $V_{eff,m=1}$ at time $T_{r(p,i=2,m=0)}$ results in minimum clock-path delay $Dc_{r(p,i=2,m=1)}$, while minimum $V_{eff,m=1}$ at time $T_{r(p,i=1,m=0)}$ results in maximum clock-path delay $Dc_{r(p,i=1,m=1)}$.

An analogous, but different, FIG. 2 could be generated for successive intermediate cells m=2 through m=$m_p$. Those analogous figures would differ from FIG. 2 in that (i) the $V_{eff,m}(t)$ waveform might be different, and, due to the effects of upstream cells, (ii) the duration between a transition and an immediately following transition in the input clock signal would not necessarily the equal ideal pulse width, and (iii) the duration between a transition and an immediately following transition of a similar kind (e.g., rising edge to rising edge or falling edge to falling edge) in the input clock signal would not necessarily equal the ideal clock cycle.

Variation in transition time is called jitter. There are several metrics for quantifying jitter. $PW_{max}$ and $PW_{min}$ are, respectively, the maximum and minimum pulse widths. Rising-edge cycle-to-cycle jitter $JT_{r,c2c,i}$ is the absolute value of the difference between (1) the ideal clock cycle $T_{ideal}$ and (2) a clock cycle defined by a rising-edge transition i and the immediately following rising-edge transition i+1. Similarly, falling-edge cycle-to-cycle jitter $JT_{f,c2c,i}$ is the absolute value of the difference between (1) the ideal clock cycle $T_{ideal}$ and (2) a clock cycle defined by a falling-edge transition i and the immediately following falling-edge transition i+1. Maximum rising-edge cycle-to-cycle jitter $JT_{r,c2c,max}$ is the maximum value from a set of rising-edge cycle-to-cycle jitter values, and maximum falling-edge cycle-to-cycle jitter $JT_{f,c2c,max}$ is the maximum value from a set of falling-edge cycle-to-cycle jitter values. Maximum periodic rising-edge jitter $JT_{r,period,max}$ and maximum periodic falling-edge jitter $JT_{f,period,max}$ are the differences between $T_{ideal}$ and a hypothetical clock cycle defined by the most- and least-delayed transitions of a similar kind from among all transitions in a simulation duration.

Excessive levels of jitter in a system can cause that system's bit error rate (BER) to exceed prescribed limits and thus render that system unacceptable. As such, systems are designed to keep jitter within specified limits. Because it is impractical to physically mock-up a billion-element electronic system prior to final manufacture, system designers use simulation software to simulate their system designs and predict system jitter. These simulation programs accept various inputs describing a system—e.g., performance profiles for various components, power supply voltages, length and composition of interconnections, etc.—and return various estimated performance statistics, such as clock-path delay.

One such simulation program, Simulation Program with Integrated Circuit Emphasis (SPICE), can be used to model every single element within a system, e.g., every transistor, every diode, etc. As such, SPICE provides an accurate prediction of system performance, but at a price of time. Modeling a single clock path in SPICE can take from two to seven hours. Thus, modeling the thousands of clock paths in a typical system with SPICE can be impractical.

An alternative modeling tool is Static Timing Analysis (STA) software, e.g., Primetime software from Synopsys Design, Inc. of Mountain View, Calif. STA models not at the element level, but at the cell level, and thus can model the performance of an entire system in a more-reasonable amount of time.

However, unlike SPICE, STA does not model system performance over a period of time, but only calculates a snapshot. Thus, since jitter is defined as variation in transition time over time, calculating clock-path jitter with STA typically involves performing two or more STA simulations.

In a typical method, the first step is to simulate $V_{eff,m}$ for an entire clock path p over a simulation duration. This simulation is typically performed with commercially available system-level power-grid modeling software from companies like Synopsys (Mountain View, Calif.) and Cadence (San Jose, Calif.).

Next, the maximum $V_{eff,m}$ is selected from the simulation results, and STA is used to calculate the clock-path delay of p given that maximum $V_{eff,m}$. STA assumes that each intermediate cell m in clock path p receives that exact same maximum $V_{eff,m}$ value, and thus the clock-path delay of clock path p will be at minimum. Then, the minimum $V_{eff,m}$ is selected from the simulation results, and a second STA simulation is performed which returns the maximum clock-path delay of clock path p. Last, the maximum and minimum clock-path delays are used as inputs for jitter metric calculations, e.g., minimum and maximum pulse widths, periodic jitter, and cycle-to-cycle jitter.

This prior-art method generates overly pessimistic jitter metrics for two reasons. First, contrary the method's assumption, it is extremely improbable that each and every intermediate cell in a clock path will be at the exact same $V_{eff,m}$ value, maximum or minimum, when it is that cell's turn to process the same transition i. Even if all intermediate cells in a clock path are receiving the same $V_{eff,m}$ value at the same time, it still takes a measurable amount of time for transition i to travel from intermediate cell m to intermediate cell m+1. Thus, even if intermediate cells m and m+1 are both at maximum/minimum $V_{eff,m}$ when intermediate cell m processes transition i, by the time transition i arrives at intermediate cell m+1, the $V_{eff,m}$ of intermediate cell m+1 may have changed, making the maximum cell delay a little smaller, or the minimum cell delay a little larger.

Second, combining minimum and maximum clock-path delays can sometimes ignore the actual behavior of $V_{eff,m}$. Specifically, physical phenomena such as package inductance and board decoupling capacitance typically prohibit $V_{eff,m}$ from going from maximum to minimum, or vice versa, in less than 10-20 nanoseconds. Thus, in a typical system operating at 1 GHz, it will take 10-20 clock cycles for $V_{eff,m}$ to go from maximum or minimum, or vice versa. In other words, it is extremely improbable that $V_{eff,m}$, and hence cell delays and clock-path delays, will vary between maximum and minimum in the space of a single pulse width or even a single cycle.

Thus, calculating maximum and minimum pulse width, cycle-to-cycle jitter, and some types of periodic jitter using the method described above is doubly pessimistic because (1) calculated maximum and minimum clock-path delays may be respectively greater or smaller than any clock-path delays encountered by a system in practice, and, (2) in practice, maximum clock-path delay will almost never be followed by minimum clock-path delay, or vice versa, in a single pulse width or clock cycle.

SUMMARY OF THE INVENTION

According to certain embodiments, the present invention removes this pessimism first by calculating $V_{eff,m}(t)$ for each intermediate cell m in clock path p for the simulation duration, and not just once for clock path p as a whole. This step eliminates the overly pessimistic assumption of the prior-art method that every intermediate cell m receives the exact same maximum or minimum $V_{eff,m}$ at the time when that intermediate cell is processing the same transition i.

In addition, instead of performing only two STA delay calculations for an entire clock path p, these embodiments of the present invention perform, for every transition i at every intermediate cell in clock path p, (i) a calculation of the average of $V_{eff,m}$ over the time cell m would delay transition i given an ideal $V_{eff,m}$, and (ii) an STA cell-delay calculation using that average $V_{eff,m}$ value.

These embodiments of the present invention then search among the pulse widths and clock cycles described by these calculated values, and identify the maximum and minimum pulse widths, maximum periodic jitter, and maximum cycle-to-cycle jitter. In contrast, the prior-art method synthesized jitter metrics out of two, unrelated, worst-case and best-case clock-delay values. Only when calculating maximum periodic jitter do these embodiments of the present invention combine maximum clock-path delay and minimum clock-path delay.

As a result, these embodiments of the present invention can perform system-wide jitter verification in a reasonable amount of time while achieving near-SPICE accuracy in the results. While there is a time penalty in calculating multiple $V_{eff,m}(t)$ waveforms and performing multiple STA calculations per intermediate cell versus two for the entire clock path, that penalty is slight. Clock paths make up only a fraction of all the nets in a typical IC, and STA simulations of clock paths are relatively quick.

According to one embodiment, the present invention is a method for characterizing performance, over a simulation duration, of an electronic circuit having one or more cells. A first computer-based simulation of the performance of the electronic circuit is executed over the simulation duration to characterize values of a cell parameter for the one or more cells. Multiple computer-based simulations of the performance of at least one cell are executed, each of the multiple simulations simulating the performance of said at least one cell at a specific point in time within the simulation duration, based on a value of the cell parameter corresponding to the specific point in time. One or more metrics are generated characterizing the performance of the electronic circuit based on results from the multiple simulations.

According to another embodiment, the present invention is a method for characterizing performance, over a simulation duration, of an electronic circuit having one or more cells. Results are received corresponding to a first computer-based simulation of the performance of the electronic circuit executed over the simulation duration to characterize values of a cell parameter for the one or more cells. Results are received corresponding to multiple computer-based simulations of the performance of at least one cell, each of the multiple simulations simulating the performance of said at least one cell at a specific point in time within the simulation duration, based on a value of the cell parameter corresponding to the specific point in time. One or more metrics are generated characterizing the performance of the electronic circuit based on the results from the multiple simulations.

DETAILED DESCRIPTION

Figure 3:
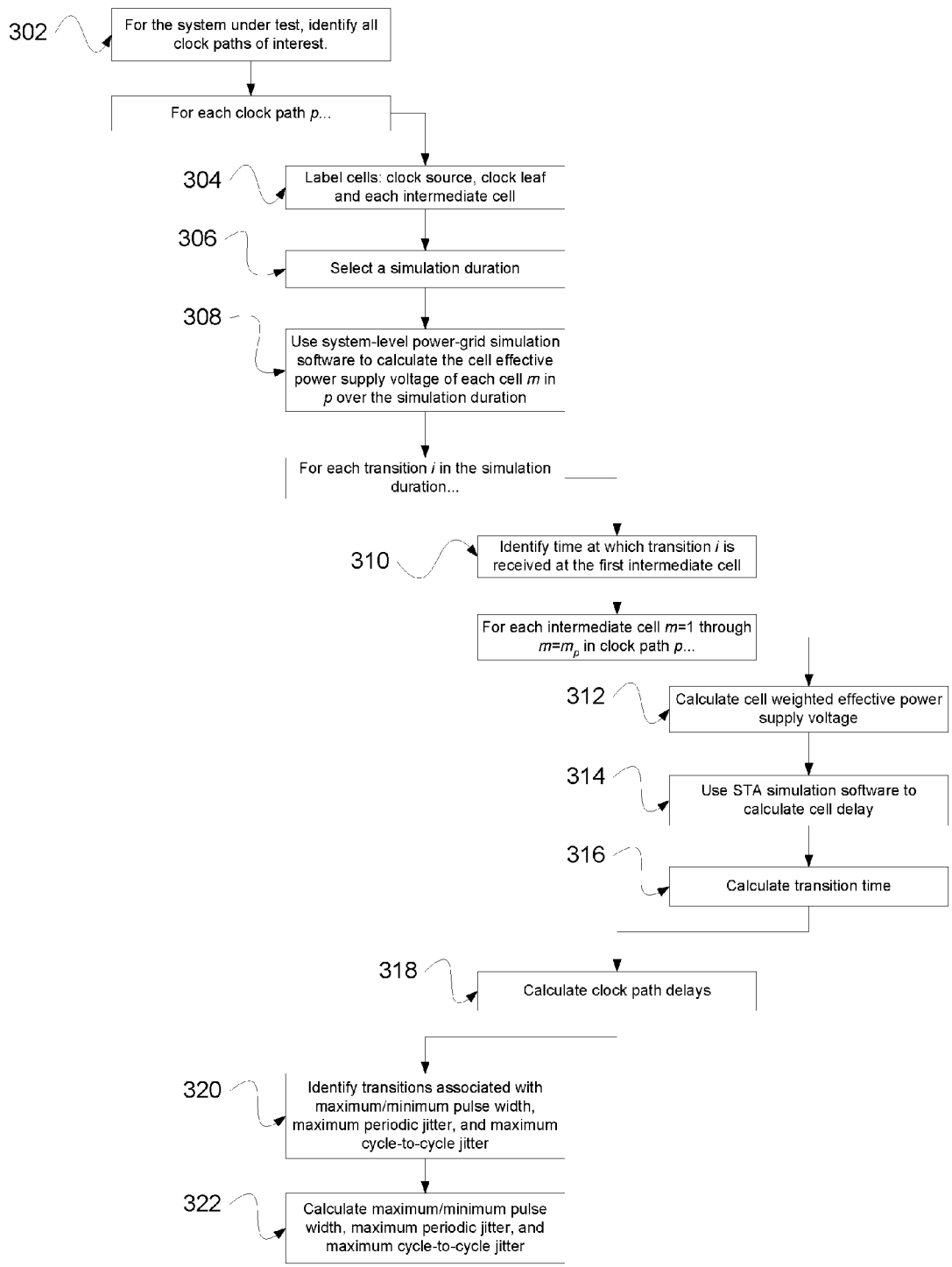
FIG. 3 is an exemplary flowchart of the steps to be performed in one embodiment of the present invention.

FIG. 3 is an exemplary flowchart of steps to be performed in one embodiment of the present invention.

The first step (302) is to identify all clock paths of interest. Some clocks within a system may be slow enough that jitter is not a concern, and a designer can exclude those clocks' paths from the simulation.

Figure 1:
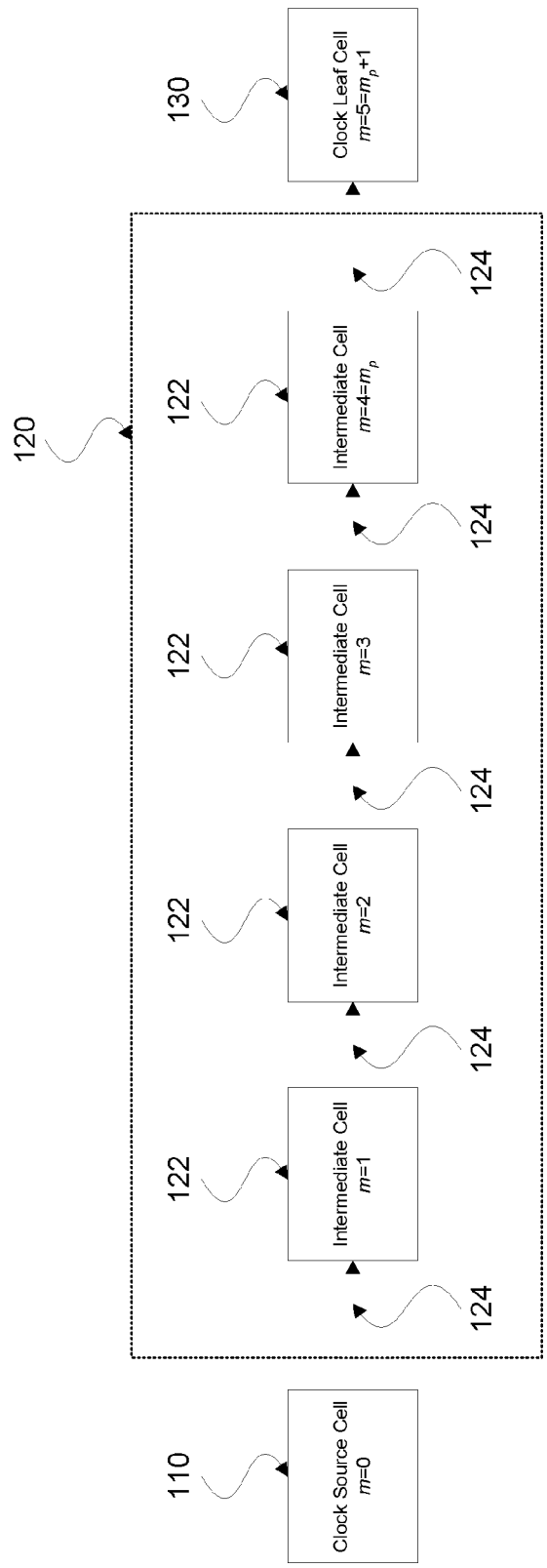
FIG. 1 is a block diagram of a typical clock path 120.
Figure 2:
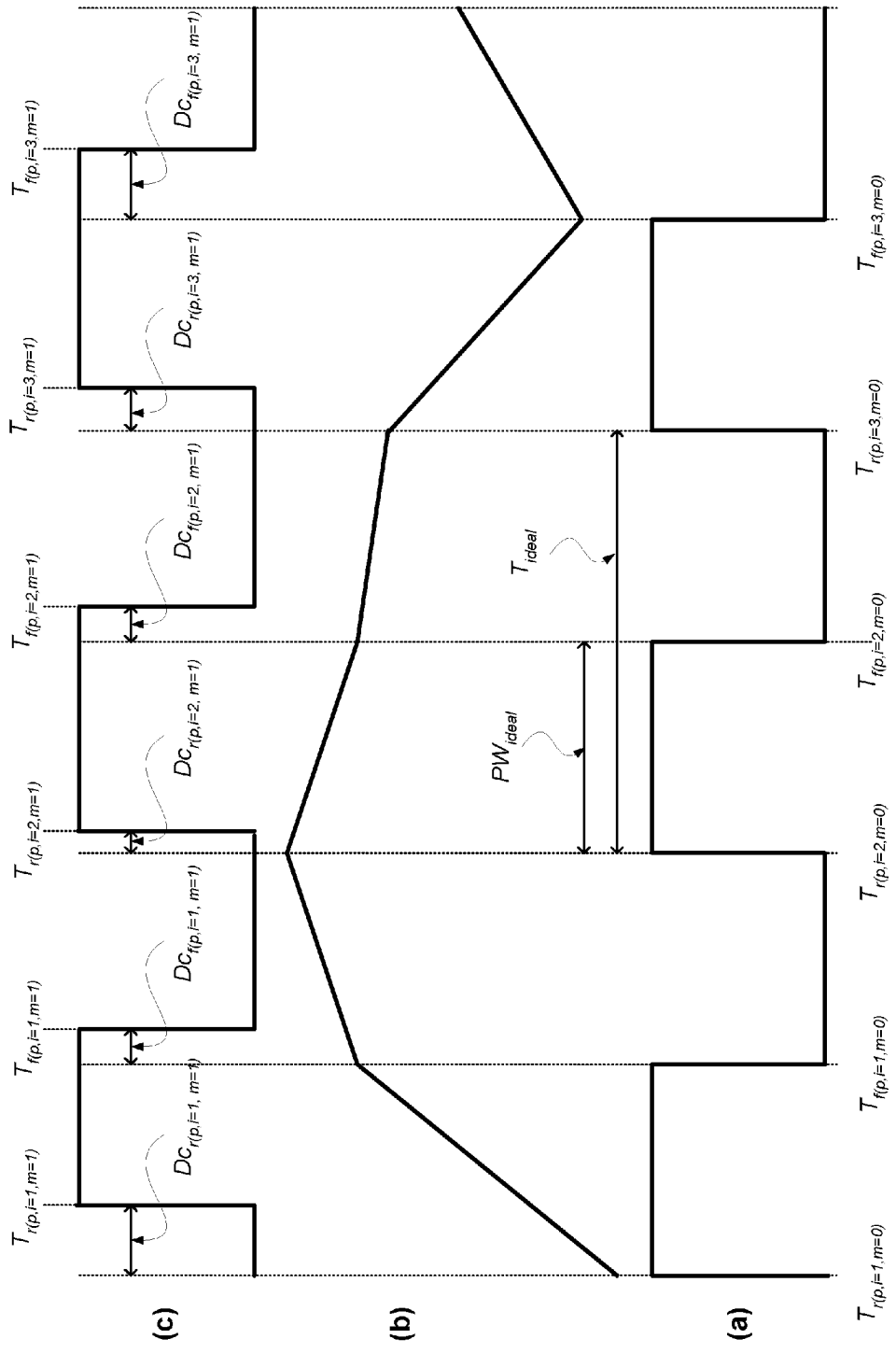
FIG. 2 graphically illustrates the effect of variations in the effective power supply voltage of an intermediate cell m in clock path p on a clock signal transiting that cell.

In the second step (304), for each clock path of interest p, let $m_p$ equal the number of intermediate cells in clock path p. Label the clock source cell m=0. Label the intermediate cells m+1 ... $m_p$. Label the clock leaf cell m=$m_p$+1. This numbering is illustrated in FIG. 1.

The third step (306) is to select a time duration for simulation, known as the simulation duration. Usually, the selected simulation duration is three to five times the duration of slowest significant cause of $V_{eff,m}$ variation. Typically, package inductance/board capacitance resonance (LC resonance) is the slowest significant cause of $V_{eff,m}$ variation. For example, if LC resonance of a simulated system is one to five nanoseconds, then the simulation duration should be roughly 20 nanoseconds.

The fourth step (308) is to simulate cell effective power supply voltage $V_{eff,m}$ for each and every intermediate cell m over the simulation duration. This calculation is typically performed with commercially available system-level power-grid simulation software. $V_{eff,m}(t)$ is defined according to the following Equation (1):

$$V_{eff,m}(t) = V_{DD,m}(t) - V_{SS,m}(t) \tag{1}$$

In other words, $V_{eff,m}(t)$ of intermediate cell m is equal to high power supply voltage $V_{DD,m}(t)$ of intermediate cell m less the low power supply voltage $V_{SS,m}(t)$ of intermediate cell m.

In the fifth step (310), for each rising-edge and falling-edge transition i in the simulation duration, identify the time, $T_{r(p,i,m=0)}$ for rising-edge transitions and $T_{f(p,i,m=0)}$ for falling-edge transitions, at which transition i is received at the input of the first intermediate cell (m=1) in clock path p.

In the sixth step (312), calculate the weighted effective power supply voltage, $V_{eff}^*{}_{r(p,i,m)}$ or $V_{eff}^*{}_{f(p,i,m)}$ of each intermediate cell m for each rising-edge and falling-edge transition i. $V_{eff}^*{}_{r(p,i,m)}$ is the weighted average of (i) $V_{eff,m}$ at time $T_{r(p,i,m-1)}$ and (ii) $V_{eff,m}$ at time $T_{r(p,i,m-1)} + Dn_m$. Likewise, $V_{eff}^*{}_{f(p,i,m)}$ is the weighted average of (i) $V_{eff,m}$ at time $T_{f(p,i,m-1)}$ and (ii) $V_{eff,m}$ at time $T_{f(p,i,m-1)} + Dn_m$.

$Dn_m$ is the nominal delay of intermediate cell m, i.e., the delay of intermediate cell m when $V_{eff,m}$ is at the ideal voltage level at which the system was designed. The weights used in calculating $V_{eff}^*{}_{r(p,i,m)}$ and $V_{eff}^*{}_{f(p,i,m)}$ will depend on the characteristics of intermediate cell m. The amount of delay of an intermediate cell m may be affected more by variations in $V_{eff,m}$ at the time that a transition is received at the cell than at the time that the transition leaves the cell. In those cases, the weighting used to calculate $V_{eff}^*{}_{r(p,i,m)}$ or $V_{eff}^*{}_{f(p,i,m)}$ should emphasize the $V_{eff,m}$ at time $T_{r(p,i,m-1)}$. For intermediate cells that are affected more by variations in $V_{eff}^*{}_{r(p,i,m)}$ or $V_{eff}^*{}_{f(p,i,m)}$ at the time that a transition leaves the cell than at the time that the transition is received at the cell, the weighting used to calculate $V_{eff}^*{}_{r(p,i,m)}$ or $V_{eff}^*{}_{f(p,i,m)}$ should emphasize the $V_{eff,m}$ at time $T_{r(p,i,m-1)} + Dn_m$.

In an alternative implementation, step 312 could be performed using other effective power supply voltages, including specific (i.e., non-average) voltage levels.

In the seventh step (314), calculate the cell delay of each intermediate cell m for each rising-edge and falling-edge transition i according to the following Equations 2(a) and 2(b):

$$Dc_{r(p,i,m)} = Dc_m(V_{eff}^*{}_{r(p,i,m)}) \tag{2a}$$

$$Dc_{f(p,i,m)} = Dc_m(V_{eff}^*{}_{f(p,i,m)}) \tag{2b}$$

Equations 2(a) and 2(b) are typically performed by STA software, and the exact formula used for $Dc_m(\ )$ will most likely be a proprietary formula of the STA vendor.

In the eighth step (316), for each rising-edge and falling-edge transition i for each intermediate cell m, calculate $T_{r(p,i,m)}$ or $T_{f(p,i,m)}$ using the following Equations (3a) and (3b):

$$T_{r(p,i,m)} = T_{r(p,i,m=m-1)} + Dc_{r(p,i,m)} \quad (1 \leq m \leq m_p) \tag{3a}$$

$$T_{f(p,i,m)} = T_{f(p,i,m=m-1)} + Dc_{f(p,i,m)} \quad (1 \leq m \leq m_p) \tag{3b}$$

In the ninth step (318), calculate the clock-path delay of clock path p for each rising-edge and falling-edge transition i using the following Equations (4a) and (4b):

$$DL_{r(p,i)} = T_{r(p,i,m=m_p)} - T_{r(p,i,m=0)} \tag{4a}$$

$$DL_{f(p,i)} = T_{f(p,i,m=m_p)} - T_{f(p,i,m=0)} \tag{4b}$$

In the tenth step (320), identify the following:

$$i_{d\ max}, \text{ where } |DL_{r(p,i=i_{d\ max})} - DL_{r(p,i=i_{d\ max}+1)}| \text{ is maximum} \quad (5)$$

In other words, search for rising-edge transition $i_{d\ max}$ such that $i_{d\ max}$ and immediately following rising-edge transition $i_{d\ max}+1$ define a clock cycle which diverges the most, positively or negatively, from ideal clock cycle $T_{ideal}$.

Also, identify the rising-edge transition with maximum clock-path delay and the rising-edge transition with minimum clock-path delay:

$$i_{max}, \text{ where } DL_{r(p,i=i_{max})} \text{ is maximum} \quad (6)$$

$$i_{min}, \text{ where } DL_{r(p,i=i_{min})} \text{ is minimum} \quad (7)$$

Repeat Equations (5) through (7) for falling-edge transitions.

Identify transition $i_{p\ max}$ such that the pulse width defined by $i_{p\ max}$ and the immediately following transition is the maximum pulse width:

$$i_{p\ max}, \text{ where } |T_{r(p,i=i_{p\ max},n=m_p)} - T_{f(p,i=i_{p\ max},n=m_p)}| \text{ is maximum} \quad (8)$$

Similarly, identify transition $i_{p\ min}$ such that the pulse width defined by $i_{p\ min}$ and the immediately following transition is the minimum pulse width:

$$i_{p\ min}, \text{ where } |T_{r(p,i=i_{p\ min},n=m_p)} - T_{f(p,i=i_{p\ min},n=m_p)}| \text{ is minimum} \quad (9)$$

In the eleventh step (322), calculate the jitter and pulse-width metrics for clock path p. Maximum rising-edge and falling-edge cycle-to-cycle jitter are defined by the following equations (10a) and (10b):

$$JT_{r,c2c,max}(p) = |DL_{r(p,i=i_{d\ max})} - DL_{r(p,i=i_{d\ max}+1)}| \quad (10a)$$

$$JT_{f,c2c,max}(p) = |DL_{f(p,i=i_{d\ max})} - DL_{f(p,i=i_{d\ max}+1)}| \quad (10b)$$

The maximum rising-edge and falling-edge periodic jitter are defined by the following Equations (11a) and (11b):

$$JT_{r,period,max}(p) = |DL_{r(p,i=i_{min})} - DL_{r(p,i=i_{max})}| \quad (11a)$$

$$JT_{f,period,max}(p) = |DL_{f(p,i=i_{min})} - DL_{f(p,i=i_{max})}| \quad (11b)$$

Maximum and minimum pulse widths are given by the following Equations (12) and (13):

$$PW_{max}(p) = |T_{r(p,i=i_{p\ max},n=m_p)} - T_{f(p,i=i_{p\ max},n=m_p)}| \quad (12)$$

$$PW_{min}(p) = |T_{r(p,i=i_{p\ min},n=m_p)} - T_{f(p,i=i_{p\ min},n=m_p)}| \quad (13)$$

The Equations (10a), (10b), (11a), (11b), (12), and (13) define six jitter metrics.

As described above, step 308 is implemented using a computer-based system-level power-grid simulation tool, and step 314 is implemented using a computer-based STA simulation tool. In certain implementations of the present invention, one or more of the other steps in FIG. 3 may be implemented by a computer-based tool that controls the execution of the system-level power-grid simulation tool and/or the STA simulation tool as part of its processing. In certain implementations, one or more of the steps in FIG. 3 may be implemented manually or using some other suitable mechanism that is independent of the computer-based simulation tools of steps 308 and 314.

In addition or alternatively, metrics other than the six specific metrics described above could be determined.

Although the present invention has been described in the context of a digital test signal having a square-wave shape, the invention can be implemented in the context of other types of test signals, including digital test signals having other shapes and even analog test signals. Yet further, any type of signal could be simulated, and not just clock signals.

Moreover, as used in this application, the term $V_{eff,m}$ should be interpreted as referring to a reference voltage level for the simulated electronic circuit, whether that reference is generated internal or external to the circuit. Although the present invention has been described in the context of measuring the effects of $V_{eff,m}$, the same technique can be applied to any time-varying signal that can affect the delay of cells. For instance, it can be used to calculate jitter due to the noise, from neighboring cells, on cells that carry a clock signal. Further, the delay calculation doesn't have to be restricted to the cells that carry clock signals, but can be applied to any cell that needs accurate calculation of delay affected by a time-varying signal.

Although the present invention has been described in the context of circuit simulations performed using the STA simulation tool, the present invention can alternatively be implemented in the context of circuit simulations performed using other suitable simulation tools, including but not limited to the SPICE tool.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer. The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A method for characterizing performance, over a simulation duration, of an electronic circuit having one or more cells, the method comprising:
   (a) executing a first computer-based simulation of the performance of the electronic circuit over the simulation duration to characterize values of a cell parameter for at least one cell;
   (b) executing multiple computer-based simulations of the performance of at least one cell, each of the multiple simulations simulating the performance of the at least one cell at a specific point in time within the simulation duration, based on a value of the cell parameter corresponding to the specific point in time; and
   (c) generating one or more metrics characterizing the performance of the electronic circuit based on results from the multiple simulations, wherein:
      the electronic circuit comprises a clock path p, defined as a sequence of one or more intermediate cells m connecting a clock source cell to a clock leaf cell, the total number of intermediate cells denoted $m_p$;
      the first simulation characterizes values of the cell parameter for at least one intermediate cell in the clock path over the simulation duration;
      for the at least one intermediate cell in the clock path, each of the multiple simulations comprises simulating the performance of the at least one intermediate cell at a specific point in time within the simulation duration, based on the at least one intermediate cell utilizing the cell parameter value corresponding to the specific point in time; and
      step (c) comprises generating the one or more metrics based on the results of the multiple simulations of the at least one intermediate cell.

2. The method of claim 1, wherein the cell parameter is the at least one cell's effective power supply voltage $V_{eff,m}$, wherein $V_{eff,m}$ is equal to the high power supply voltage $V_{DD,m}$ for the at least one cell minus the low power supply voltage $V_{SS,m}$ for the at least one cell.

3. The method of claim 2, wherein the first simulation is performed by a computer-based system-level power-grid simulation tool.

4. The method of claim 1, wherein:
   the electronic circuit comprises a plurality of clock paths;
   the first simulation characterizes values of the cell parameter for at least one intermediate cell in at least two of the clock paths in the electronic circuit over the simulation duration;
   for the at least one intermediate cell in the at least two clock paths, each of the multiple simulations comprises simulating the performance of the at least one intermediate cell at a specific point in time within the simulation duration, based on the value of the cell parameter corresponding to the specific point in time; and
   step (c) comprises generating the one or more metrics based on the results of the multiple simulations of the at least one intermediate cell in the at least two clock paths.

5. The method of claim 1, wherein:
   the cell parameter is the cell's effective power supply voltage $V_{eff,m}$; and
   for the at least one intermediate cell, each of the multiple simulations comprises:
      (i) calculating a weighted effective power supply voltage $V_{eff}^*{}_{(p,i,m)}$ of the at least one intermediate cell for a signal event i; and
      (ii) implementing a computer-based simulation tool to simulate the at least one intermediate cell's cell delay $Dc_{(p,i,m)}$ of the signal event i at the at least one intermediate cell's weighted effective power supply voltage $V_{eff}^*{}_{(p,i,m)}$.

6. The method of claim 5, wherein $V_{eff}^*{}_{(p,i,m)}$ is a weighted average of (i) the cell's effective power supply voltage $V_{eff,m}$ at a first time at which the signal event i arrives at an input of intermediate cell m and (ii) the cell's effective power supply voltage $V_{eff,m}$ at a second time corresponding to the first time plus a nominal delay value for intermediate cell m, wherein the nominal delay value is the intermediate cell's cell delay $Dc_{(p,i,m)}$ of the signal event i at an ideal effective power supply voltage.

7. The method of claim 5, wherein the computer-based simulation tool is Static Timing Analysis (STA) software.

8. The method of claim 1, wherein the results from the multiple simulations comprise transition times of at least one of rising-edge transitions and falling-edge transitions of a clock signal propagating along the clock path p.

9. The method of claim 8, wherein the one or more metrics comprise maximum pulse width, wherein the maximum pulse width is the largest difference between transition times corresponding to two consecutive transitions in the results from the multiple simulations.

10. The method of claim 8, wherein the one or more metrics comprise minimum pulse width, wherein the minimum pulse width is the smallest difference between transition times corresponding to two consecutive transitions in the results from the multiple simulations.

11. The method of claim 8, wherein the one or more metrics comprise maximum cycle-to-cycle jitter, wherein the maximum cycle-to-cycle jitter is the largest difference between (1) the difference between (i) the transition time that a first transition is received at the input of the clock leaf cell and (ii) the transition time that the first transition is received at the input of the first intermediate cell in clock path p and (2) the difference between (i) the transition time that a second transition, corresponding to a transition of a similar kind immediately following the first transition, is received at the input of the clock leaf cell and (ii) the transition time that the second transition is received at the input of the first intermediate cell, in the results from the multiple simulations.

12. The method of claim 8, wherein the one or more metrics comprise maximum periodic jitter, wherein the maximum periodic jitter is the difference between (1) the largest difference between (i) the transition time that a first transition is received at the input of the clock leaf cell and (ii) the transition time that the first transition is received at the input of the first intermediate cell in clock path p and (2) the smallest difference between (i) the transition time that a second transition, of the same type as the first transition, is received at the input of the clock leaf cell and (ii) the transition time that the second transition is received at the input of the first intermediate cell, in the results from the multiple simulations.

13. The method of claim 1, wherein step (c) is implemented using a computer-based module.

14. A computer-implemented method for characterizing performance, over a simulation duration, of an electronic circuit having one or more cells, the method comprising:
(a) receiving results corresponding to a first computer-based simulation of the performance of the electronic circuit over the simulation duration to characterize values of a cell parameter for the at least one cell;
(b) receiving results corresponding to multiple computer-based simulations of the performance of at least one cell, each of the multiple simulations simulating the performance of the at least one cell at a specific point in time within the simulation duration, based on a value of the cell parameter corresponding to the specific point in time; and
(c) generating one or more metrics characterizing the performance of the electronic circuit based on the results from the multiple simulations, wherein:
the electronic circuit comprises a clock path p, defined as a sequence of one or more intermediate cells m connecting a clock source cell to a clock leaf cell, the total number of intermediate cells denoted $m_p$;
the first simulation characterizes values of the cell parameter for at least one intermediate cell in the clock path over the simulation duration;
for the at least one intermediate cell in the clock path, each of the multiple simulations simulates the performance of the at least one intermediate cell at a specific point in time within the simulation duration, based on the at least one intermediate cell utilizing the cell parameter value corresponding to the specific point in time; and
step (c) comprises generating the one or more metrics based on the results of the multiple simulations of the at least one intermediate cell.

15. An apparatus for characterizing performance, over a simulation duration, of an electronic circuit having one or more cells, the apparatus comprising:
(a) a first means for receiving results corresponding to a first computer-based simulation of the performance of the electronic circuit over the simulation duration to characterize values of a cell parameter for the one or more cells;
(b) a second means for receiving results corresponding to multiple computer-based simulations of the performance of at least one cell, each of the multiple simulations simulating the performance of the at least one cell at a specific point in time within the simulation duration, based on a value of the cell parameter corresponding to the specific point in time; and
(c) a third means for generating one or more metrics characterizing the performance of the electronic circuit based on the results from the multiple simulations, wherein:
the electronic circuit comprises a clock path p, defined as a sequence of one or more intermediate cells m connecting a clock source cell to a clock leaf cell, the total number of intermediate cells denoted $m_p$;
the first simulation characterizes values of the cell parameter for at least one intermediate cell in the clock path over the simulation duration;
for the at least one intermediate cell in the clock path, each of the multiple simulations simulates the performance of the at least one intermediate cell at a specific point in time within the simulation duration, based on the at least one intermediate cell utilizing the cell parameter value corresponding to the specific point in time;
the means for generating one or more metrics comprises means for generating the one or more metrics based on the results of the multiple simulations of the at least one intermediate cell;
and at least one of the first means, the second means, and the third means comprises a processor.

16. The apparatus of claim 15, wherein the apparatus further comprises means for executing the multiple simulations.

17. The apparatus of claim 16, wherein the apparatus further comprises means for executing the first simulation.

18. A non-transitory computer-readable medium, having encoded thereon program code, wherein, when the program code is executed by a computer, the computer implements a method for characterizing performance, over a simulation duration, of an electronic circuit having one or more cells, the method comprising:
(a) receiving results corresponding to a first computer-based simulation of the performance of the electronic circuit over the simulation duration to characterize values of a cell parameter for the one or more cells;
(b) receiving results corresponding to multiple computer-based simulations of the performance of at least one cell, each of the multiple simulations simulating the performance of the at least one cell at a specific point in time within the simulation duration, based on a value of the cell parameter corresponding to the specific point in time; and
(c) generating one or more metrics characterizing the performance of the electronic circuit based on the results from the multiple simulations, wherein:
the electronic circuit comprises a clock path p, defined as a sequence of one or more intermediate cells m connecting a clock source cell to a clock leaf cell, the total number of intermediate cells denoted $m_p$;
the first simulation characterizes values of the cell parameter for at least one intermediate cell in the clock path over the simulation duration;
for the at least one intermediate cell in the clock path, each of the multiple simulations simulates the performance of the at least one intermediate cell at a specific point in time within the simulation duration, based on the at least one intermediate cell utilizing the cell parameter value corresponding to the specific point in time; and
step (c) comprises generating the one or more metrics based on the results of the multiple simulations of the at least one intermediate cell.

19. The non-transitory computer-readable medium of claim 18, further comprising the program code for implementing the computer-based simulation tool to simulate the operation of the electronic circuit.

* * * * *